March 21, 1933.  C. S. BULL  1,902,276
GAUGE FOR LOW TEMPERATURE FLUIDS
Filed Jan. 20, 1930
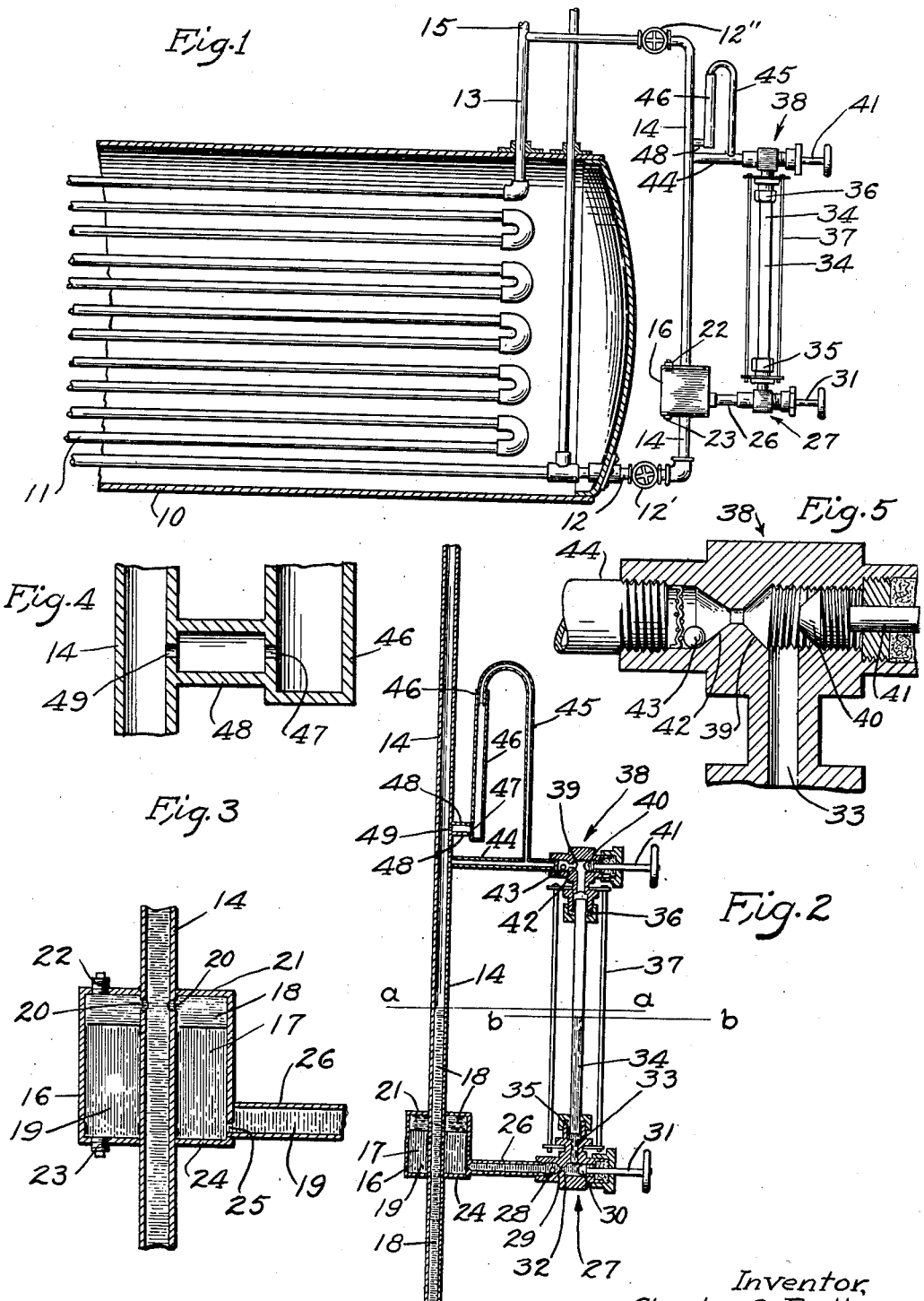
Inventor,
Charles S. Bull.
By Townsend, Loftus & Abbett.
Attorneys Patented Mar. 21, 1933

1,902,276

UNITED STATES PATENT OFFICE

CHARLES S. BULL, OF COLTON, CALIFORNIA

GAUGE FOR LOW TEMPERATURE FLUIDS

Application filed January 20, 1930. Serial No. 421,889.

This invention relates to refrigeration apparatus, and particularly pertains to a gauge for low temperature fluids.

In the operation of refrigeration apparatus, such as ice making plants, it is essential that the level of the liquid ammonia, or other low temperature liquid, occurring within the low pressure or evaporating side of the apparatus, shall be accurately ascertained and properly maintained. Numerous devices have been provided for this purpose, but due to the temperature of the ammonia it is difficult to ascertain the level of the ammonia, since condensation may take place upon the gauges used and will be sufficiently heavy to prevent observation of the low temperature liquid level within the gauge.

It is the principal object of the present invention to provide a gauge for low temperature fluids, within which a liquid level may be observed without danger of condensation upon the gauge tube, and without necessity of insulating the walls of the gauge tube from the atmosphere to prevent condensation.

The present invention contemplates the provision of a vertical tube sight gauge, within which an oil herein designated as a non-freezing liquid is placed, and which liquid is acted upon by a column of low temperature liquid, the level of which is established by the level of the low temperature liquid within the apparatus, whereby relative level of the low temperature liquid and non-freezing indicating liquid may be obtained.

The invention is illustrated by way of example in the accompanying drawing, in which:

Figure 1 is a fragmentary view in vertical section, in elevation, showing the application of the present invention to an ammonia tank of refrigerating apparatus.

Fig. 2 is a view in vertical section showing the ammonia gauge and the details of its construction.

Fig. 3 is an enlarged view in vertical section showing the liquid trap and the relation of the ammonia and non-freezing liquid therein.

Fig. 4 is an enlarged fragmentary view showing the condensate trap.

Fig. 5 is an enlarged fragmentary view showing the combined plunger and check valve structure.

Referring more particularly to the drawing, 10 indicates the shell of a piece of ice making apparatus, having a suitable cooling coil 11 therein. A pipe 12 connects with the low side of the cooling coil and a pipe 13 connects with the high side of the cooling coil. Pipe 12 is provided with a vertical pipe 14, which extends upwardly and connects the low side of the ammonia coil 12 with the high side 13. The pipe 13 connects with a suction line 15. The pipe 14 extends upwardly through a cylindrical trap 16. This trap is of larger diameter than the pipe and thus provides a chamber 17 within which two liquids are placed, the liquid ammonia indicated at 18 by horizontal lines, and a non-freezing liquid 19 indicated by vertical lines in Figs. 2 and 3. Ammonia gains access to the trap 16 through ducts 20, extending through the side wall of the pipe 14, and at a point directly beneath the upper end wall 21 thereof. A screw plug 22 extends through the end wall 21 and may be removed when desired, to fill the trap 16, and is provided particularly for the non-freezing liquid. A screw plug 23 extends through the bottom 24 of the trap 16 and makes it possible to drain out the contents of the trap, particularly the non-freezing liquid.

Near the bottom of the trap 16, and through the side wall thereof, is an opening 25, through which the non-freezing liquid may flow to a horizontally extending pipe 26. Mounted upon the outer end of this pipe is a valve structure 27 embodying the use of a ball valve 28, adapted to register with its seat 29 at certain times in the operation of the gauge, and a taper valve mounted upon a valve stem 31, and adapted to be brought to register with its seat 32, when it is desired to discontinue the flow of non-freezing liquid through the pipe 26. A suitable stuffing gland is mounted around valve stem 31. A vertical passageway 33 extends upwardly from the valve chamber, at the bottom of which the seat 32 occurs. This passageway is in communication with a tubular sight glass 34, within which the non-freezing liquid may rise until it reaches a level comparable with the level of the ammonia.

It will be understood that it may be possible that the level of the ammonia and the non-freezing indicating liquid will not be coincident due to variation between the spesific gravity of the ammonia and the non-freezing liquid, or other physical characteristics thereof, such as constituency and viscosity.

As shown in Fig. 2 the level of the non-freezing liquid is lower than the level of the ammonia. This degree of variation is immaterial, however, as the levels will at all times be relative to each other and will provide a proper index as to the level of the ammonia within the coils. The lower end of the sight tube 34 is mounted within a stuffing gland 35. The upper end of the sight tube 34 is mounted within a stuffing gland 36, and this assembly is protected by the usual vertical rods 37. At the upper end of the sight gauge tube 34 is a valve structure 38. This includes a valve chamber in communication with the upper end of the tube, and having a tapered seat 39, upon which valve 40 may be seated to close off the sight gauge from the rest of the apparatus. Valve 40 is mounted upon the valve stem 41, and an oppositely facing valve seat 42 may receive a ball valve 43, which portion of the valve is in communication with a horizontal pipe 44, extending from the valve 38 to the vertical pipe 14.

An inverted U-tube 45 is connected by one leg to the pipe 44 and by the other leg to a pipe 48, having a small opening 47 in its side wall in communication with the pipe 48 secured to the vertical pipe 14. A small opening 49 occurs through the vertical pipe 14 and establishes communication with a pipe 48. This structure is particularly shown in Fig. 4 of the drawing. The U-tube 45 and the structure shown in Fig. 4 are provided to trap any ammonia gas which might tend to pass over into the gauge from pipe 48. This would condense in the U-tube. The condensed liquid may then pass through the pipe 48, as restricted by the passageways 47 and 49 and drain back into the ammonia column 14.

In operation of the present invention, it will be assumed that the evaporation boiler 10, or other similar apparatus, is equipped with conduits through which ammonia is circulated, and within which it is desirable to constantly ascertain the level at which the liquid ammonia stands. This is to be done in the present case by the structure particularly shown in Fig. 2 of the drawing. In setting the machine in operation the sight glass tube 34 is suitably filled with a non-freezing liquid which will partially fill the trap up at a level which will always be less than the level at which the ammonia opening 20 in ammonia column 14 occurs. The ammonia rising in the column 14 to seek its own level will stand at the level line indicated at $a$—$a$ in Fig. 2, and will create a hydrostatic head upon the body of non-freezing liquid in the chamber 17 of the trap 16. This will cause the non-freezing liquid to assume a level in the sight-tube 24, as may be indicated by lines $b$—$b$. The exact relative levels $a$—$a$ and $b$—$b$ will be determined by the relative physical characteristics of the ammonia and the non-freezing liquid, and the manner in which the relation of the two liquids is adjusted through the opening control by the drain plugs 22 and 23. In the event of any rupture of the gauge or its parts during the operation of the machine, the excessive pressure of the liquid within the column 14, either above or below the liquid level $a$—$a$, will act to move the ball valves 28 or 43, to bring them to their seats 29 or 42, and temporarily interrupt communication between the two respective pipes 26 and 44, and the opposite ends of the gauge structure. This will close off the ammonia pipes from the atmosphere and prevent a disastrous leakage of ammonia gas. In the event that it is desired to completely interrupt operation of the gauge, the valves 30 and 40 may be manipuated by their valve stems 31 and 41 to close the gauge 34 at both of its ends.

It will be evident that upon variation in the level of the ammonia as indicated by the level line $a$—$a$, this variation can be read by direct corresponding variation in the level of the non-freezing liquid, as indicated by the line $b$—$b$.

In the event that ammonia gasifies and finds its way into and through the gauge tube 34, it will pass upwardly through the U-tube 45, and then will be admitted downwardly into expansion tube 46, where it will condensate and be trapped. It will then drain outwardly through the openings 47 and 49 and the intermediate trap pipe 48.

When it is desired to interrupt operation of the gauge completely for any reason, valve 12' may be closed completely until all of the ammonia has passed out of column 14 and trap 16 and into the coil after which valve 12'' may be closed to completely cut off the gauge from the suction line 15.

It will thus be seen that by the use of the structure here disclosed, a non-freezing liquid, having a latent heat valve much greater than that of the ammonia in the system of the refrigeration apparatus will be presented for observation in a sight gauge under atmospheric temperature conditions, and will be effected by the level of the ammonia within the system, thus making it possible to directly read the levels at which the ammonia stands without attendant variations, which cause condensation to occur upon the sight gauge and prevent the taking of satisfactory readings.

While I have shown the preferred form of my invention as now known to me, it will be understood that various changes may be made in combination, construction, and arrangement of parts by those skilled in the art without departing from the spirit of my invention as claimed.

Having thus described my invention, what I claim and desire to secure by Letters Patent is:—

1. In combination with refrigeration apparatus, having a low temperature liquid coil therein, a tube connected across the terminals of said coil, and standing vertically, whereby the level of the liquid within the tube will agree with the level of the liquid within the coil, a trap forming a chamber around the tube and through which the tube extends, said tube being formed with openings through the walls thereof within the trap, and against the top thereof, whereby the low temperature liquid within the column may flow into the trap, a relatively non-freezing liquid of greater weight per volume than the low temperature liquid and disposed in the bottom of the trap, and upon which the low temperature liquid rests, and a sight gauge connected with the bottom of the said trap and into which said non-freezing liquid may flow under pressure of the hydrostatic head of the low temperature liquid in the tube, and whereby a definite relationship may be obtained between the level of the non-freezing compound in the sight gauge and the liquid in the tube.

2. In combination with refrigeration apparatus, having a low temperature liquid coil therein, a tube connected across the terminals of said coil, and standing vertically, whereby the level of the liquid within the tube will agree with the level of the liquid within the coil, a trap forming a chamber around the tube and through which the tube extends, said tube being formed with openings through the walls thereof within the trap, and adjacent the top thereof, whereby the liquid within the tube may flow into the trap, a relatively non-freezing liquid of greater weight per volume than the non-freezing liquid and disposed in the bottom of the trap, and upon which the low temperature liquid rests, and a sight gauge connected with the bottom of the said trap and into which said non-freezing liquid may flow under pressure of the hydrostatic head of the low temperature liquid in the tube, and whereby a definite relationship may be obtained between the level of the non-freezing compound in the sight gauge and the low temperature liquid in the tube, and a return pipe connecting the upper end of the sight gauge with the tube at a point above the level of the liquids, whereby fluids may flow from the sight gauge into the tube.

3. In combination with refrigeration apparatus, having a low temperature liquid coil therein, a tube connected across the terminals of said coil, and standing vertically, whereby the level of the liquid within the tube will agree with the level of the liquid within the coil, a trap forming a chamber around the tube and through which the tube extends, said tube being formed with openings through the wall thereof within the trap, and adjacent the top thereof, whereby the low temperature liquid within the column may flow into the trap, a relatively non-freezing liquid of greater weight per volume than the non-freezing liquid and disposed in the bottom of the trap, and upon which the low temperature liquid rests, and a sight gauge connected with the bottom of the said trap and into which said non-freezing liquid may flow under pressure of the hydrostatic head of the low temperature liquid in the tube, and whereby a definite relationship may be obtained between the level of the non-freezing compound in the sight gauge and the liquid in the tube, and a return pipe connecting the upper end of the sight gauge with the tube at a point above the level of the liquids, whereby fluids may flow from the sight gauge into the tube, said structure including a U-tube for entrapping condensation and causing it to flow into the tube only.

4. In combination with refrigeration apparatus, having a low temperature liquid coil therein, a tube connected across the terminals of said coil, and standing vertically, whereby the level of the liquid within the tube will agree with the level of the liquid within the coil, a trap forming a chamber around the tube and through which the tube extends, said tube being formed with openings through the wall thereof within the trap, and adjacent the top thereof, whereby liquid within the tube may flow into the trap, a relatively non-freezing liquid of greater weight per volume than the low temperature liquid, said non-freezing liquid being disposed in the bottom of the trap, and upon which the low temperature liquid rests, and a sight gauge connected with the bottom of said trap and into which said non-freezing liquid may flow under pressure of the hydrostatic head of the low temperature liquid in the tube, and whereby a definite relationship may be obtained between the level of the non-freezing compound in the sight gauge and the liquid in the tube, a return pipe connecting the upper end of the sight gauge with the tube at a point above the level of the liquids and valve means in said return pipe line whereby excessive pressure within the tube will cause the valve to close, and prevent this pressure from being imposed upon the gauge.

5. In combination with refrigeration apparatus, having a low temperature liquid coil therein, a tube connected across the terminals of said coil, and standing vertically, whereby the level of the liquid within the tube will agree with the level of the liquid within the coil, a trap forming a chamber around the tube and through which the tube extends, said tube being formed with openings through the walls thereof within the trap, and adjacent the top thereof, whereby liquid within the tube may flow into the trap, a relatively non-freezing liquid of greater weight per volume than the low temperature liquid, said non-freezing liquid being disposed in the bottom of the trap, and upon which the low temperature liquid rests, and a sight gauge connected with the bottom of the said trap and into which said non-freezing liquid may flow under pressure of the hydrostatic head of the low temperature liquid in the tube, and whereby a definite relationship may be obtained between the level of the non-freezing compound in the sight gauge and the low temperature liquid in the tube, and a return pipe connecting the upper end of the sight gauge with the tube at a point above the level of the liquids, whereby fluids may flow from the sight gauge into the tube, and check valves interposed between the tube and the opposite ends of the sight gauge.

CHARLES S. BULL.